United States Patent
Chappalli et al.

(10) Patent No.: US 12,493,940 B2
(45) Date of Patent: *Dec. 9, 2025

(54) DYNAMIC ALLOCATION OF DYNAMIC BINS FOR VARIABLE DYNAMIC RANGE IMAGE CONTENT

(71) Applicant: Apple Inc., Cupertino, CA (US)

(72) Inventors: Mahesh B. Chappalli, San Jose, CA (US); Alexey Kornienko, Watford (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,998

(22) Filed: Jun. 13, 2024

(65) Prior Publication Data

US 2024/0331119 A1 Oct. 3, 2024

Related U.S. Application Data

(63) Continuation of application No. 17/362,923, filed on Jun. 29, 2021, now Pat. No. 12,026,861.

(60) Provisional application No. 63/072,087, filed on Aug. 28, 2020.

(51) Int. Cl.
*G06T 5/00* (2024.01)
*G06T 5/40* (2006.01)
*G06T 5/92* (2024.01)

(52) U.S. Cl.
CPC .............. *G06T 5/92* (2024.01); *G06T 5/40* (2013.01); *G06T 2207/20208* (2013.01)

(58) Field of Classification Search
CPC ... G06T 2207/20208; G06T 5/92; G06T 5/40; H04N 9/68; H04N 9/646; H04N 19/33; H04N 19/98; H04N 5/20
See application file for complete search history.

(56) References Cited

U.S. PATENT DOCUMENTS

| | | | |
|---|---|---|---|
| 10,032,402 B2 | 7/2018 | Kempf | |
| 10,104,334 B2 | 10/2018 | Evans et al. | |
| 10,176,561 B2 | 1/2019 | Evans et al. | |
| 10,560,695 B2 | 2/2020 | Pettersson et al. | |
| 2008/0018800 A1 | 1/2008 | Kodavalla | |
| 2018/0218481 A1 | 8/2018 | Evans et al. | |
| 2020/0193572 A1* | 6/2020 | Zhou | G09G 5/026 |
| 2020/0302659 A1* | 9/2020 | Urabe | G06T 5/92 |

(Continued)

OTHER PUBLICATIONS

Khan, Ishtiaq Rasool, Wajid Aziz, and Seong-O. Shim. "Tone-mapping using perceptual-quantizer and image histogram." IEEE Access 8 (2020): 31350-31358.*

(Continued)

*Primary Examiner* — Li Liu
(74) *Attorney, Agent, or Firm* — Fletcher Yoder, P.C.

(57) ABSTRACT

Methods and systems include determining an upper boundary of brightness values of high-dynamic range image content. Using the determined upper boundary, end points of bins of histogram values are determined. Using the determined end points of the bins of histogram values, luma values are allocated to the bins. The high-dynamic range image content is processed based at least in part on the allocations to the bins. Image data including the processed high-dynamic range image content is displayed via an electronic display.

20 Claims, 11 Drawing Sheets

(56) References Cited

U.S. PATENT DOCUMENTS

2020/0351524 A1* 11/2020 Lee ..................... H04N 19/182

OTHER PUBLICATIONS

Mantiuk, Rafał, Scott Daly, and Louis Kerofsky. "Display adaptive tone mapping." ACM SIGGRAPH 2008 papers. 2008. 1-10.*

Khan, Ishtiaq Rasool, et al. "A tone-mapping technique based on histogram using a sensitivity model of the human visual system." IEEE Transactions on Industrial Electronics 65.4 (2017): 3469-3479. (Year: 2017).

Husseis, Anas, Anissa Mokraoui, and Basarab Matei. "Revisited Histogram Equalization as HDR Images Tone Mapping Operators." International Symposium on Signal Processing and Information Technology (ISSPIT). 2017.

Ploumis, Stelios, et al. "Perception-based Histogram Equalization for tone mapping applications." 2016 Digital Media Industry & Academic Forum (DMIAF). IEEE, 2016.

* cited by examiner

US 12,493,940 B2

DYNAMIC ALLOCATION OF DYNAMIC BINS FOR VARIABLE DYNAMIC RANGE IMAGE CONTENT

CROSS REFERENCE TO RELATED APPLICATIONS

This application is a continuation of U.S. patent application Ser. No. 17/362,923, filed Jun. 29, 2021, which claims priority from and the benefit of U.S. Provisional Application No. 63/072,087, filed Aug. 28, 2020, each of which is hereby incorporated by reference in its entirety for all purposes.

BACKGROUND

The present disclosure relates generally to dynamic allocation of dynamic bins for variable dynamic range image content in an electronic device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Even in a single electronic device, different video signals may carry image content with different levels of high-dynamic range (HDR) or extended dynamic range (EDR) content. For example, video signals may utilize 2×, 4×, 8×, or 16× content that has different luma levels, where luma is a way of approximating the human perception of an object brightness that is a signal used in local tone mapping of image content. A histogram of the luma values for the content may be collected and allocated into bins for processing. However, locations of transitions (i.e., break points) between the bins that may be ideal for some content (e.g., having full range up to 16×) while unsatisfactory for other content (e.g., having a range up to 8×). For example, at least some parts of some of the bins (e.g., highest bins) may be unused for some content (e.g., up to 4×). When using only a portion of the bins, the granularity used to cause the HDR/EDR to be displayed consistently may be lost.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Figure 1:
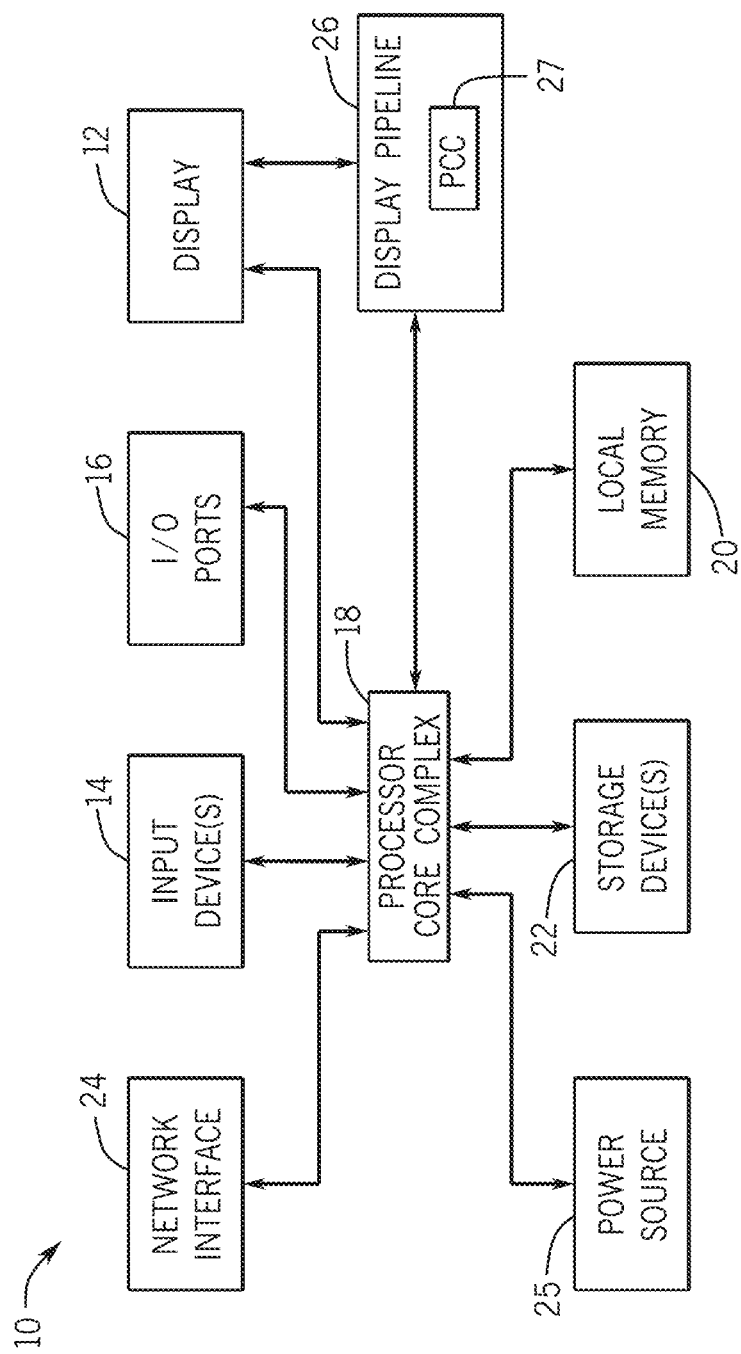
FIG. 1 is a block diagram of an electronic device with a display having a display pipeline with pixel contrast control (PCC) circuitry, in accordance with an embodiment of the present disclosure.

As will be described in more detail below, an electronic device 10 that uses such dynamic bin allocation, such as the electronic device 10 shown in FIG. 1, may be any suitable electronic device, such as a computer, a mobile phone, a portable media device, a wearable device, a tablet, a television, a virtual-reality headset, a vehicle dashboard, and the like. Thus, it should be noted that FIG. 1 is merely an example of a particular implementation and is intended to illustrate the types of components that may be present in the electronic device 10.

In the depicted embodiment, the electronic device 10 includes an electronic display 12, one or more input devices 14, one or more input/output (I/O) ports 16, a processor core complex 18 having one or more processor(s) or processor cores, local memory 20, a main memory storage device 22, a network interface 24, a power source 25, a display pipeline 26, and/or pixel contrast control (PCC) circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

The processor core complex 18 may execute instruction stored in local memory 20 and/or the main memory storage device 22 to perform operations, such as generating and/or transmitting image data. As such, the processor core complex 18 may include one or more processors, such as one or more microprocessors, one or more application specific processors (ASICs), one or more field programmable logic arrays (FPGAs), one or more graphics processing units (GPUs), or the like. Furthermore, as previously noted, the processor core complex 18 may include one or more separate processing logical cores that each process data according to executable instructions.

The local memory 20 and/or the main memory storage device 22 may store the executable instructions as well as data to be processed by the cores of the processor core complex 18. Thus, the local memory 20 and/or the main memory storage device 22 may include one or more tangible, non-transitory, computer-readable media. For example, the local memory 20 and/or the main memory storage device 22 may include random access memory (RAM), read only memory (ROM), rewritable non-volatile memory such as flash memory, hard drives, optical discs, and the like.

The network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G, LTE, or 5G cellular network. The network interface 24 includes one or more antennas configured to communicate over network(s) connected to the electronic device 10. The power source 25 may include any suitable source of energy, such as a rechargeable lithium polymer (Li-poly) battery and/or an alternating current (AC) power converter.

The I/O ports 16 may enable the electronic device 10 to receive input data and/or output data using port connections. For example, a portable storage device may be connected to an I/O port 16 (e.g., Universal Serial Bus (USB)), thereby enabling the processor core complex 18 to communicate data with the portable storage device. The I/O ports 16 may include one or more speakers that output audio from the electronic device 10. The processor core complex 18 may include one or more coprocessors or other microprocessors configured to supplement the capabilities of a primary processor (e.g., central processing unit).

The input devices 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio. The input devices 14 may include touch-sensing components in the electronic display 12. In such embodiments, the touch sensing components may receive user inputs by detecting occurrence and/or position of an object touching the surface of the electronic display 12.

The electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. In some embodiments, the electronic display 12 may be a display using liquid crystal display (LCD), a self-emissive display, such as an organic light-emitting diode (OLED) display, or the like.

The display pipeline 26 may be used to transport image data from the processor core complex 18 to the electronic display 12. In some embodiments, the display pipeline 26 may be used to process the image data. For instance, the display pipeline 26 may include pixel contrast control (PCC) circuitry 27 that may be used to control pixel contrast. The PCC circuitry 27 may include a coprocessor that assists the processor core complex 18 in processing the image data. Additionally or alternatively, the display pipeline 26 and/or the PCC circuitry 27 may be at least partially implemented in the processor core complex 18.

Figure 2:
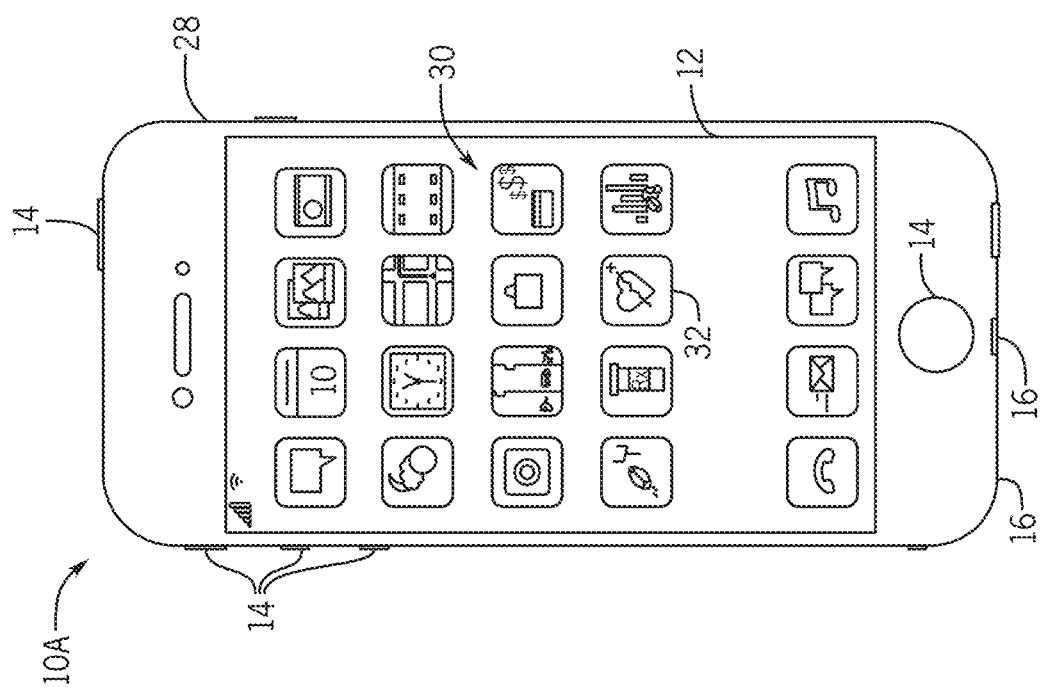
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) 30 having an array of icons 32. By way of example, when an icon 32 is selected either by an input device 14 or a touch-sensing component of the electronic display 12, a corresponding application may launch.

Input devices 14 may extend through the enclosure 28. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. The I/O ports 16 may also extend through the enclosure 28. In some embodiments, the I/O ports 16 may include an audio jack to connect to external devices. As previously noted, the I/O ports 16 may include one or more speakers that output sounds from the handheld device 10A.

Figure 3:
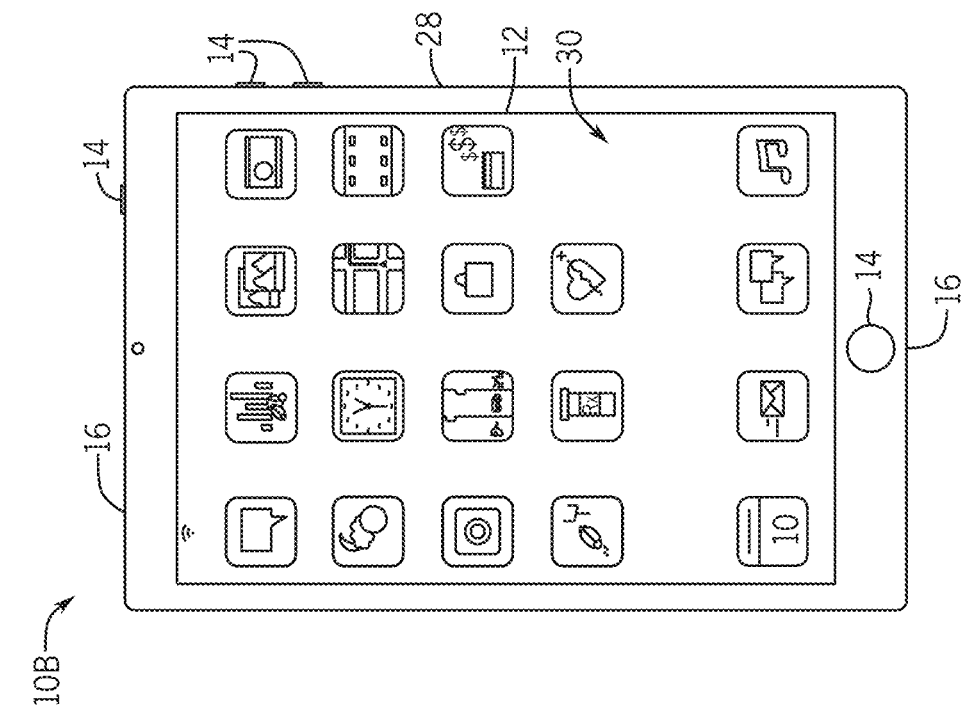
FIG. 3 is another example of the electronic device of FIG. 1, in accordance with an embodiment of the present disclosure.
Figure 4:
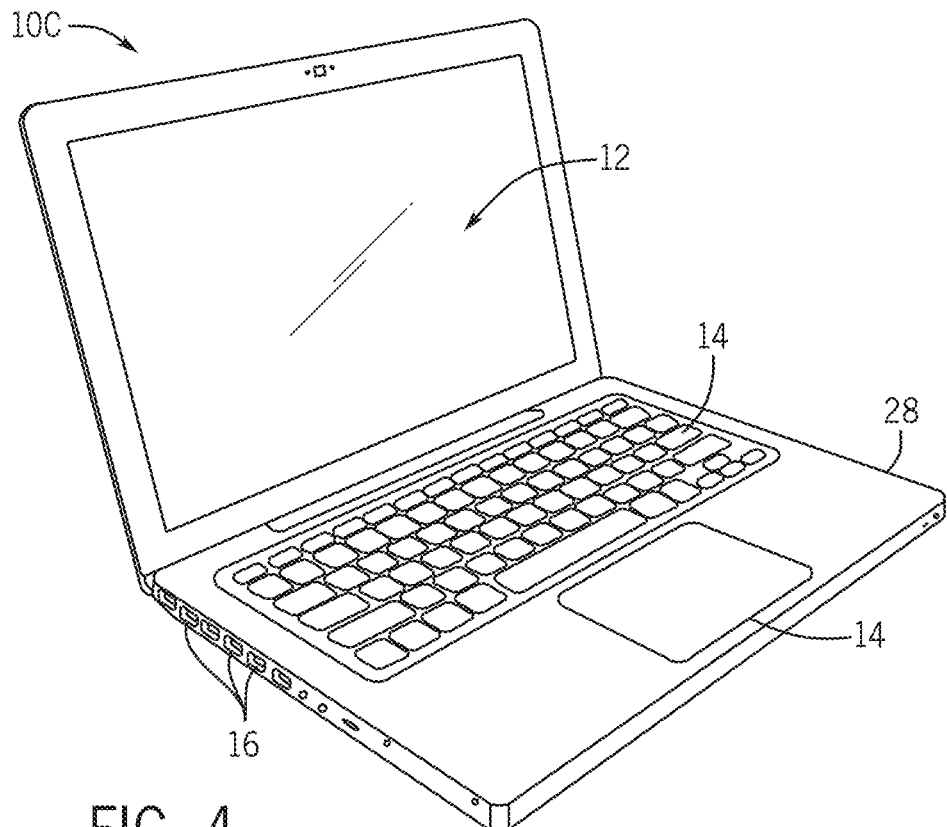
FIG. 4 is another example of the electronic device of FIG. 1, in accordance with an embodiment of the present disclosure.
Figure 5:
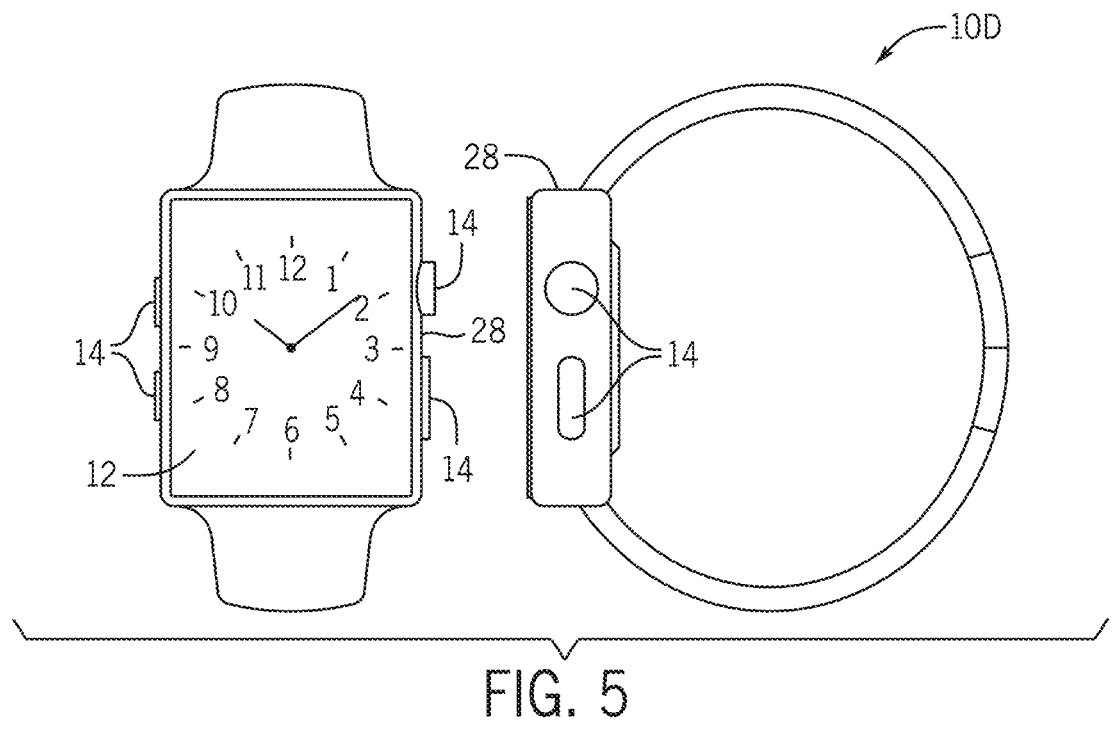
FIG. 5 is another example of the electronic device of FIG. 1, in accordance with an embodiment of the present disclosure.

Another example of a suitable electronic device 10 is a tablet device 10B shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 28.

Figure 6:
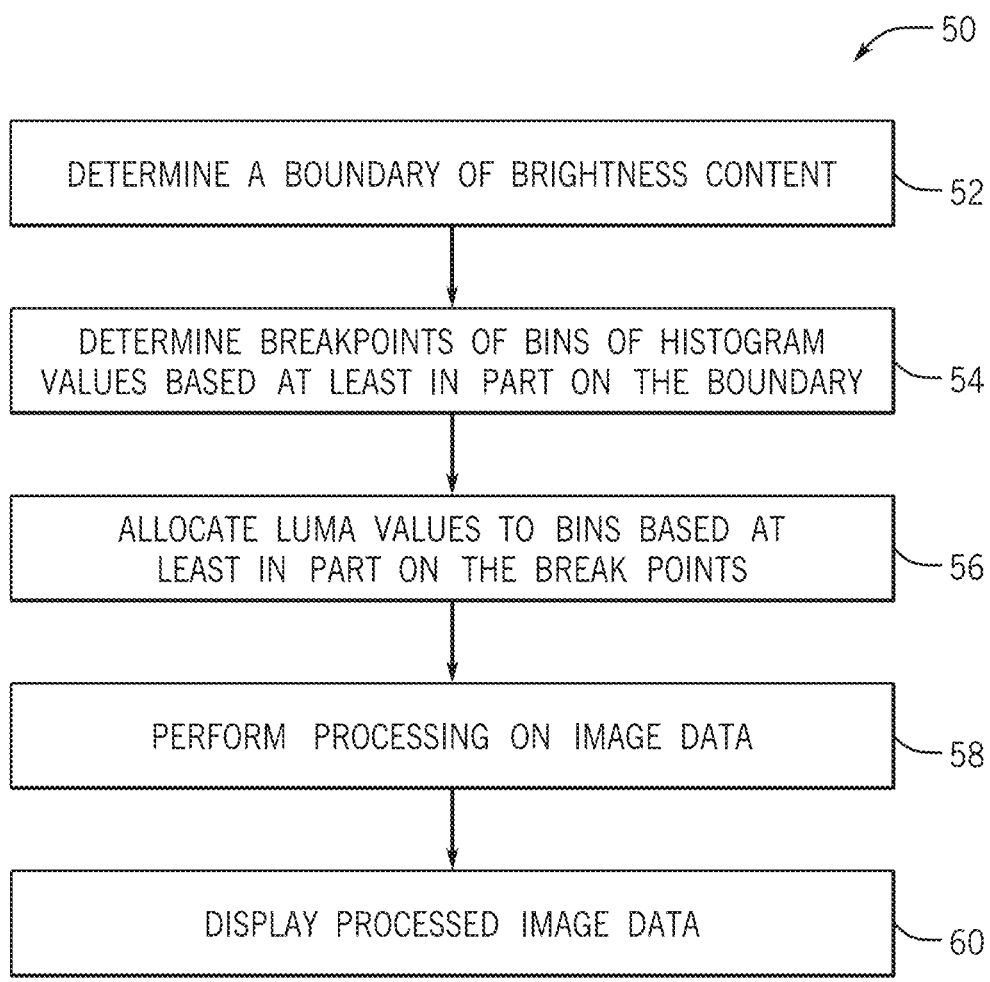
FIG. 6 is a block diagram of a process using dynamic bins for luma values for the electronic device of FIG. 1, in accordance with an embodiment of the present disclosure.

FIG. 6 is a flow diagram of a process 50 that may be used to provide improved bin-allocation to provide consistent display of HDR data regardless of what level of luma (e.g., 2×, 4×, 8×, and 16×) is used for the HDR. Specifically, the PCC circuitry 27 may determine a boundary of brightness content (e.g., luma content) of image data (block 52). For example, the PCC circuitry 27 may determine that a maximum luma value of the HDR data is some integer (e.g., 2, 4, 8, 16) times greater than the SDR values. The PCC circuitry 27 determines break points or endpoints of bins for histogram luma values based at least in part on the boundary (block 54). The break points or endpoints for the bins may be also based at least in part on the number of bins used for the HDR content. The luma values of the brightness content are allocated to bins based at least in part on the break points or endpoints of the bins (block 56). The PCC circuitry 27, the display pipeline 26, and/or the processor core complex 18 then processes the image data based at least in part on the allocated values (block 58). The electronic display 12 then displays the processed image data based at least in part on the allocated values (block 60).

Figure 7:
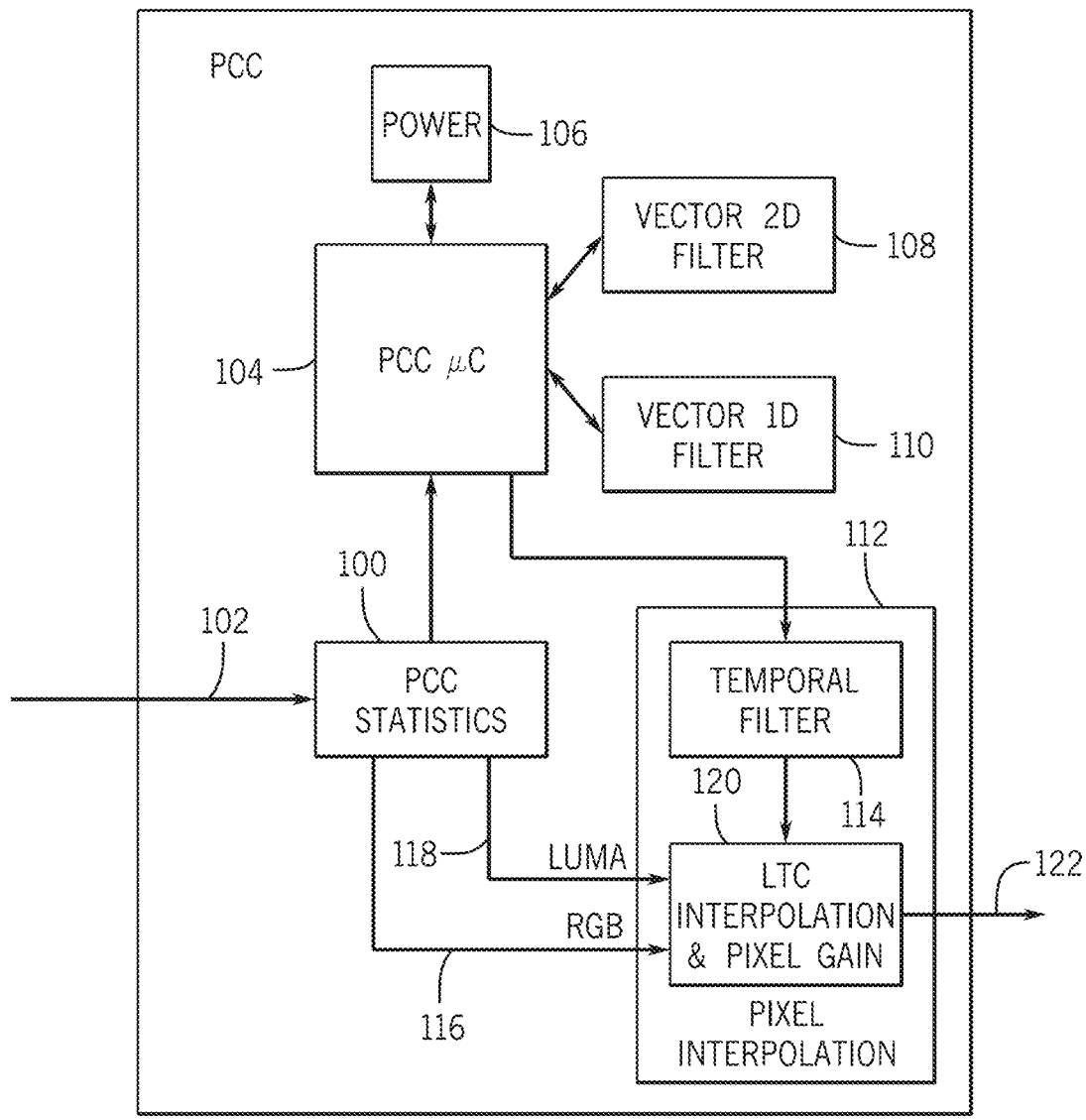
FIG. 7 is a block diagram of an embodiment of the PCC circuitry of FIG. 1, in accordance with an embodiment of the present disclosure.

FIG. 7 is an illustration of an embodiment of the pixel contrast control (PCC) circuitry 27. Specifically, the PCC circuitry 27 may improve readability/viewability in bright ambient environments and reduction of backlight on LCD panels to save power while retaining perceptual fidelity through local tone mapping. The PCC circuitry 27 includes a PCC statistics collector 100 that receives image data 102 and collects statistics (e.g., local and/or global statistics) and passes the statistics to a PCC co-processor 104. The statistics may include luminance, delay, variance of luminance, maximum values, average values, headroom, histograms, and/or other statistics related to the image data 102.

To boost the performance of firmware running on the PCC co-processor 104, hardware assistance is available in the form of accelerators. A blocking accelerator 106 and two non-blocking accelerators 108 and 110 are available to the PCC co-processor. Any suitable number of blocking or non-blocking accelerators may be used. The non-blocking accelerators 108 and 110 may feed each other, read data from memory, and/or write the result to memory. To support firmware data flows, the non-blocking accelerators 108 and 110 may support continuation of processing after power-gating. For example, the non-blocking accelerators 108 and 110 may retain all state information that is used to continue processing/operation. In some embodiments, it is the responsibility of firmware running on the PCC co-processor 104 to ensure that all non-blocking accelerators 108 and 110 are in an appropriate state (e.g., WAIT or IDLE state) prior to power-gating. If the non-blocking accelerators 108 and 110 are in any other states when power-gating occurs, correct operation after power gating has ended may not be guaranteed.

The non-blocking accelerator 110 may include a vector 1D filter that operates on input data consisting of an array of units with each unit being a vector of elements. The non-blocking accelerator 110 is used to filter input data. The non-blocking accelerator 110 may include interface registers as well as additional registers to identify a number of bits used to represent each element and to identify filter taps to be used in the filtration.

The non-blocking accelerator 108 may include a vector 2D filter. For example, the vector 2D filter may operate on the input data with a two-dimensional FIR filter. The non-blocking accelerator 108 may include interface registers as well as additional registers to identify a number of bits used to represent each element, identify a size of the filter, and identify filter taps to be used in the filtration.

The blocking accelerator 106 may include a power function hardware accelerator that assists the PCC co-processor 104 in performing power function calculations for the PCC circuitry 210.

Using the calculations in the PCC co-processor 104 and the PCC statistics, a pixel interpolator 112 is used to adjust the image data 102. The pixel interpolator 112 includes a temporal filter 114 that is used to filter outputs from the PCC co-processor 104. The pixel interpolator 112 also receives RGB values 116 and luma values 118 gathered by the PCC statistics collector 100. The pixel interpolator 112 uses the filtered values from the PCC co-processor 104, the luma values 118, and the RGB values 116 to perform a local tone curve (LTC) and pixel gain compensation using an LTC interpolation and pixel gain compensator 120 to output interpolated image values 122.

The luma values 118 may include a uniformly sampled multi-bin (e.g., 256-bin, 512-bin, 1,024-bin, 2,048-bin) histogram. As previously discussed, luma is a way of approximating the human perception of an object brightness and is relied upon for local tone mapping. Luma values may be calculated in various different modes in the PCC statistics collector 100. Various modes may include, for example: 1) a mix mode using a mix of RGB weighted average and maximum values, 2) a normalized L component mode using a normalized L component from the International Commission on Illumination LAB color space ("Lab color space"), and 3) a normalized I component mode using a normalized I component from ITP or Itch color spaces. These methods may be used to calculate single channel luma from a three-channel RGB signal.

Figure 8:
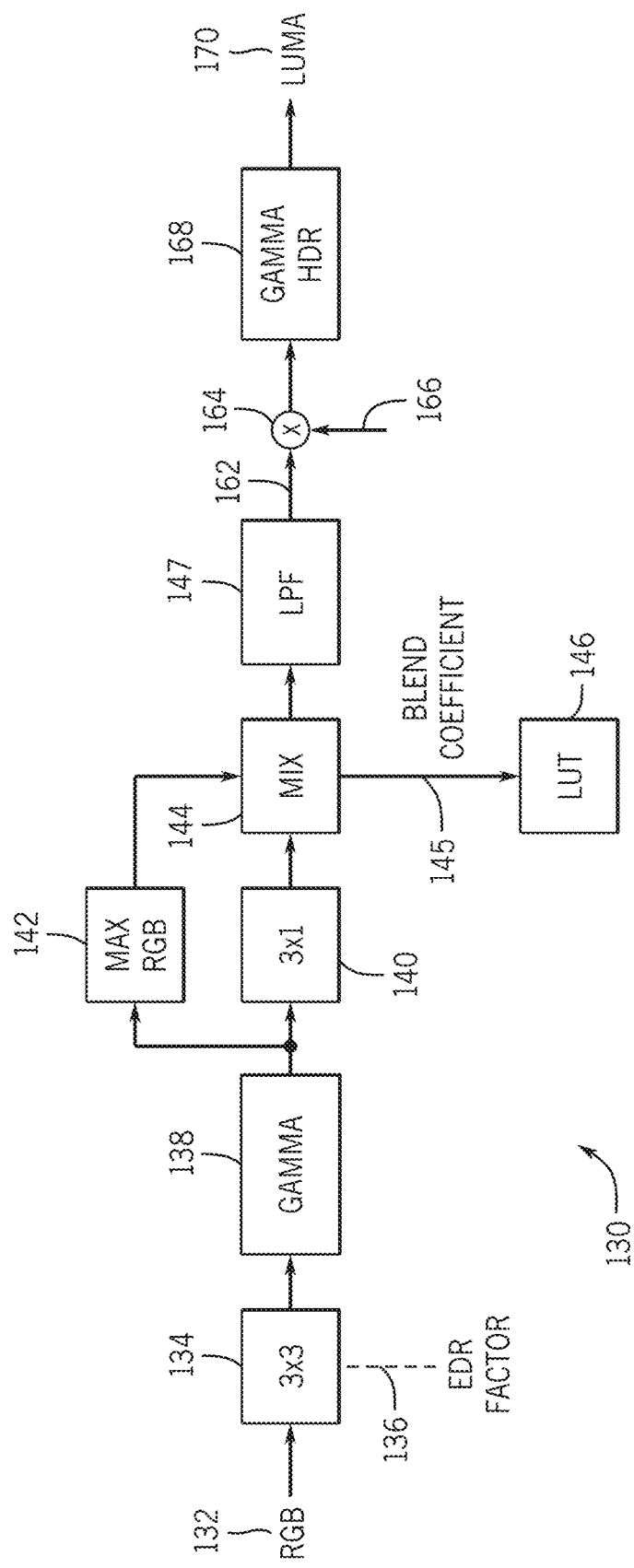
FIG. 8 is a block diagram of luma calculations performed using the PCC circuitry of FIG. 7 using a low-pass filter (LPF) and HDR gamma, in accordance with an embodiment of the present disclosure.

FIG. 8 is block diagram of luma calculation 130 that may be performed in the PCC statistics collector 100. An RGB signal 132 is received at a 3×3 matrix 134. As illustrated, the RGB signal 132 may include a 3-channel RGB signal. The 3×3 matrix 134 is used to perform vector multiplication with an extended dynamic range (EDR) factor 136 when the mix mode is deployed. The EDR factor 136 may indicate how far the image content extends above SDR image content. In other words, the EDR factor 136 may indicate how much headroom exists in the image content above the SDR content. When using the normalized L component mode, the 3×3 matrix 134 may be unused or bypassed. In the normalized I component mode, the 3×3 matrix 134 may be used to convert the RGB signal 132 into LMS color space. Gamma block 138 may include a lookup table (LUT) to encode an output of the 3×3 matrix 134 for the mix mode and the normalized I component mode.

As previously noted, the mix mode may be used to mix average and maximum values from the RGB signal 132. A 3×1 matrix 140 is used to calculate the average values, and a 3× max matrix is used to calculate the maximum value from the RGB signal 132. A mixer 144 is used to mix these two values to determine a single-channel luma from the three-channels of the RGB signal 132. The mixer blends the average and maximum values with a blend coefficient 145. For example, the blend coefficient may be stored in a LUT 146 that is indexed by the average value and/or the maximum value. Interpolation may be used to determine values that are not explicitly defined in the LUT 146.

In the normalized L component mode, the maximum values are not used. Instead, the 3×1 matrix 140 is used to convert the RGB data to a Y luminance channel. Similarly, in the normalized I component mode, the maximum value is not used, and the 3×1 matrix 140 is used to convert the LMS (with applied gamma) to output a single I component.

In the normalized L component mode and the normalized I component mode, the single channel values are filtered using a low-pass filter (LPF) 147 to provide just low spatial frequency components. This low-pass filtering may be used to preserve original low contrast of image content. The coefficients for the LPF 147 may be provided by firmware (e.g., firmware of the PCC co-processor 104).

Figure 9:
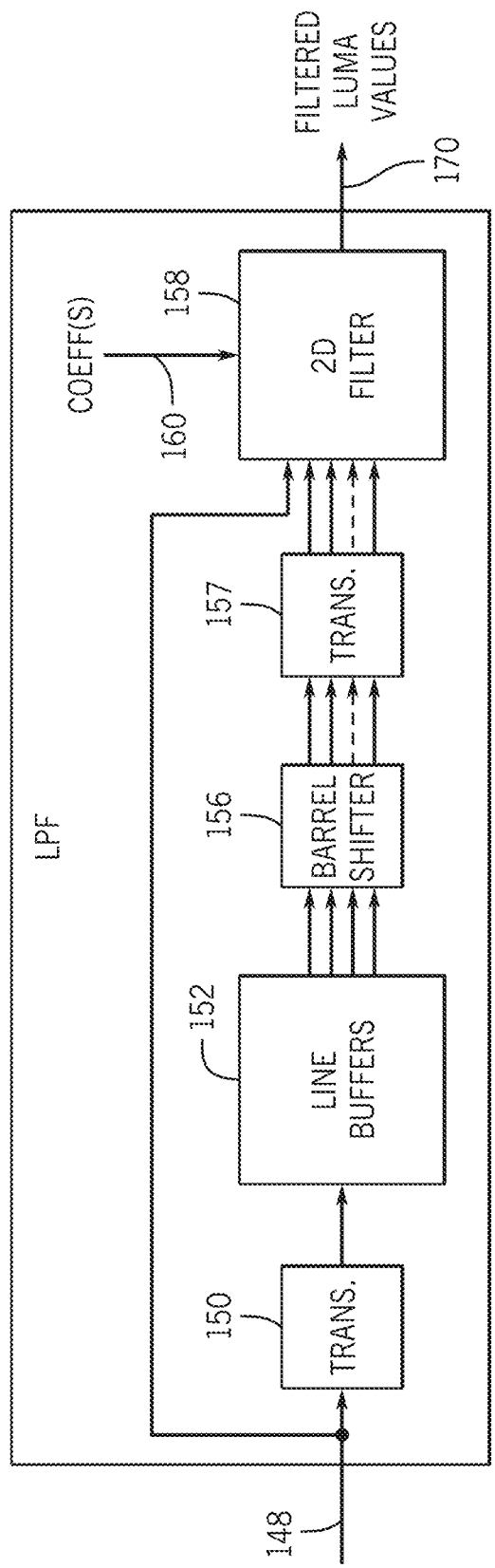
FIG. 9 is a block diagram of the LPF of FIG. 8, in accordance with an embodiment.

FIG. 9 is a block diagram of one possible embodiment of the LPF 147 using unsigned floating-point-number representation. The LPF 147 receives luma values 148 that have been converted and/or mixed in the PCC statistics collector 100. In some embodiments, a translator 150 may be used to translate the values in the luma values 148 into another format having a reduced sized compared to the luma values 148. For example, the translator 150 may translate the luma values 148 into a specific unsigned floating-point representation with a specified number of bits (e.g., 5) assigned to an exponent and a specified number of bits (e.g., 9) assigned to a mantissa. This reduced-size format is stored in line buffers 152. The reduced size may be efficient without sacrificing image quality by causing coefficients used in the LPF 147 to add to a certain number (e.g., one) to ensure that the output range of data does not exceed an input range. The buffered values in the line buffer 152 are shifted using a barrel shifter 156 and re-translated back to an input format of the luma values 148 using a translator 157. The luma values 148 and the re-translated values are passed through a two-dimensional separable filter 158. The two-dimensional separable filter 158 may be a separable filter with horizontal and vertical coefficients 160. The two-dimensional separable filter 158 outputs filtered luma values 162. The programmable coefficient(s) 160 may be used to output an SDR level with sufficient headroom to achieve a maximum HDR luma level.

Figure 10:
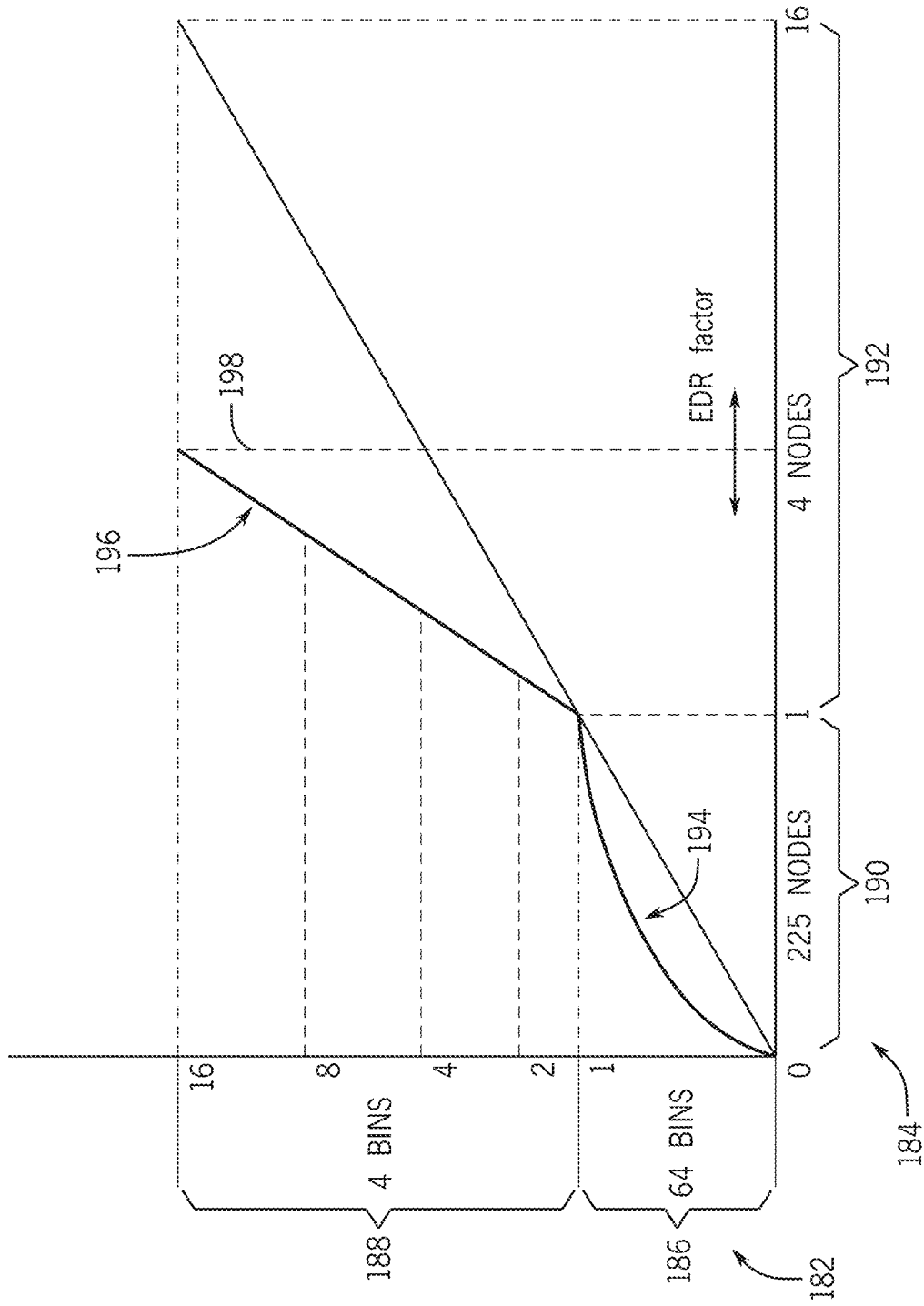
FIG. 10 is a graph a transfer function used to apply the HDR gamma of FIG. 8, in accordance with an embodiment.

Returning to FIG. 8, the filtered luma values 162 are transmitted to a multiplier 164 that is multiplied by a factor 166. The factor 166 may be the EDR factor 136 divided by a number of available HDR levels (e.g., 16) for the normalized L and I modes. In the mix mode, the factor 166 may be inverse to the number of available HDR levels. The multiplied luma values have a luma gamma HDR 168 applied to form output luma values 170. The luma gamma HDR 168 may apply gamma to the HDR using a LUT table and/or a transfer function. For instance, FIG. 10 illustrates a graph 180 of a possible transfer function that may be used to apply luma gamma to HDR content. As illustrated, the graph 180 plots bins with corresponding luma values 182 versus nodes with corresponding input values 184. The bins are allocated to SDR bins 186 and HDR bins 188. The illustrated bins include 64 SDR bins 186 and 4 HDR bins 188. However, other embodiments may include any number of bins for the SDR and/or the HDR content. Similarly, the input values 184 may be allocated to SDR nodes 190 and HDR nodes 192. Although the illustrated graph 180 reflects 225 nodes for SDR content and 4 nodes for HDR content, some embodiments may include any suitable number of nodes for the SDR and/or the HDR content. For SDR content, a first curve 194 is applied while HDR has a second curve 196 applied until an endpoint 198 at least partially based on the EDR factor 136.

Figure 11:
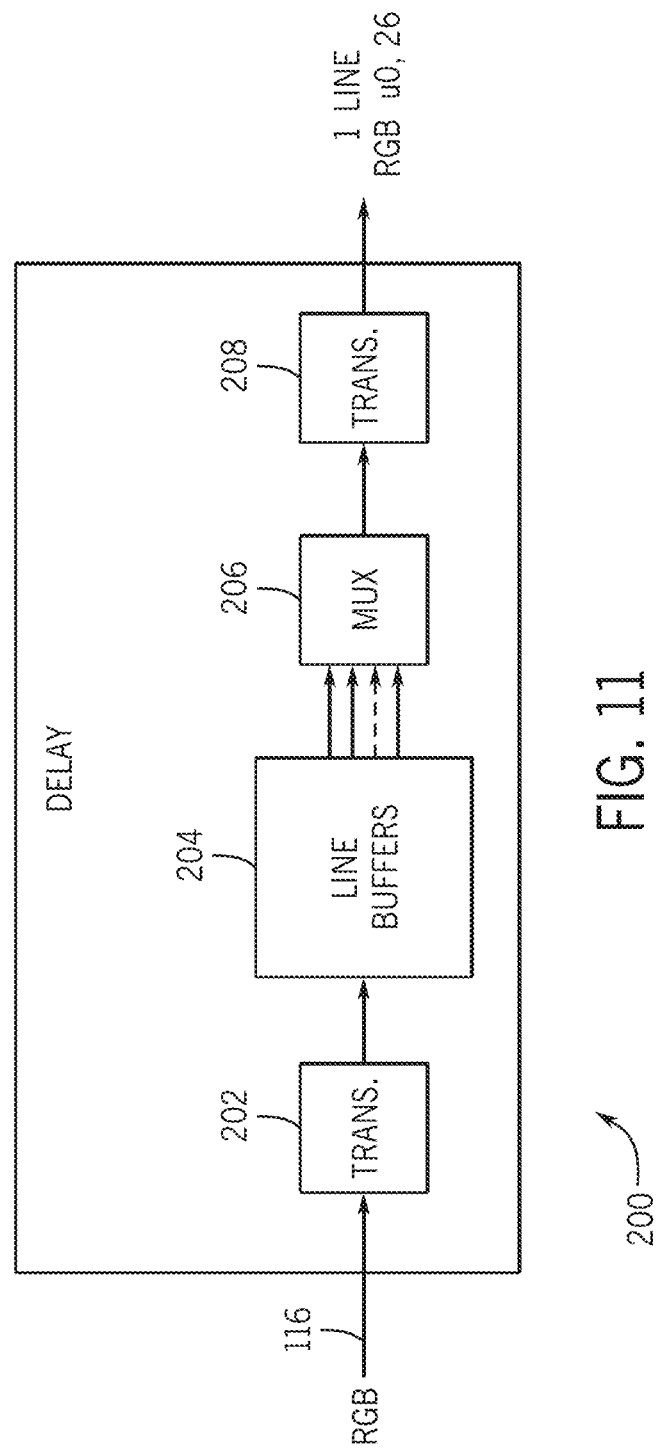
FIG. 11 is a block diagram of delay circuitry used to delay RGB values to align the RGB values to a venter of a kernel of the LPF, in accordance with an embodiment of the present disclosure.

In some embodiments, the PCC circuitry 27 may utilize one or more delay lines to align the RGB components to a center of a kernel of the LPF 147. For example, the LTC interpolation and pixel gain compensator 120 of the PCC circuitry 27 of FIG. 7 may utilize delay circuitry. For instance, FIG. 11 illustrates a block diagram of delay circuitry 200 that may be an embodiment of delay circuitry that may be used in the LTC interpolation and pixel gain compensator 120. The delay circuitry 200 receives the RGB values 116 from the PCC statistics collector 100. In some embodiments, the delay circuitry 200 may include a translator 202 to translate the RGB values 116 to some relatively low-memory format (e.g., the unsigned floating-point number used in the LPF 147) using less bits than the input RGB values 116. For instance, the translator 202 may be similar to the translator 150 of FIG. 9. The delay circuitry 200 includes a line buffer 204 that stores a number of lines (e.g., 3) having a number of bits defined in the RGB values 116 or the translated format if the translator 202 is used. The values stored in the line buffer 204 are transmitted to a multiplexer 206 where appropriate values are selected at a specific time to align the values to the kernel of the LPF 147. When the translator 202 is used, an additional translator 208 may be used to translate from the format used by the line buffer 204 back to a format used by the RGB values 116.

As previously discussed, a global luma histogram may utilize a number (e.g., 16, 32, 64) of SDR bins for SDR in a range of 0 to 1. In some embodiments, the number of SDR bins may be set using a configuration setting such that the number of SDR bins may be programmatically changed using software and/or firmware. A number (e.g., 4) of HDR bins may be allocated to values above 1 and up to a maximum value (e.g., 16). The HDR bins may be non-equidistant with bins closer to 1 covering a range of less values than bins further from the value of 1. However, due to the limited number of HDR bins and the dynamic nature of the amount of levels used for HDR content, bin granularity may be inconsistent relative to the signal. For instance, if static HDR bin break points are defined at certain points through an entire possible HDR range (e.g., 1×-16×), some bins are unused when content is only included in a lower range (e.g., 1×-4×) of the possible range. The break points are the values above which are assigned to a first set of bins while the values below are assigned to another set of bins. In other words, portions (or all) of one or more bins may be go unused causing the values to be unevenly distributed throughout the HDR bins potentially inhibiting consistency of display of HDR. Instead, as previously discussed, the PCC co-processor 104 and/or another processor may be used to determine an upper boundary for the HDR content and set the break points based at least in part on the upper boundary.

In other words, different streams of HDR content in a same electronic device 10 may utilize different break points when different upper boundaries of the HDR content are present in the different streams.

Figure 12:
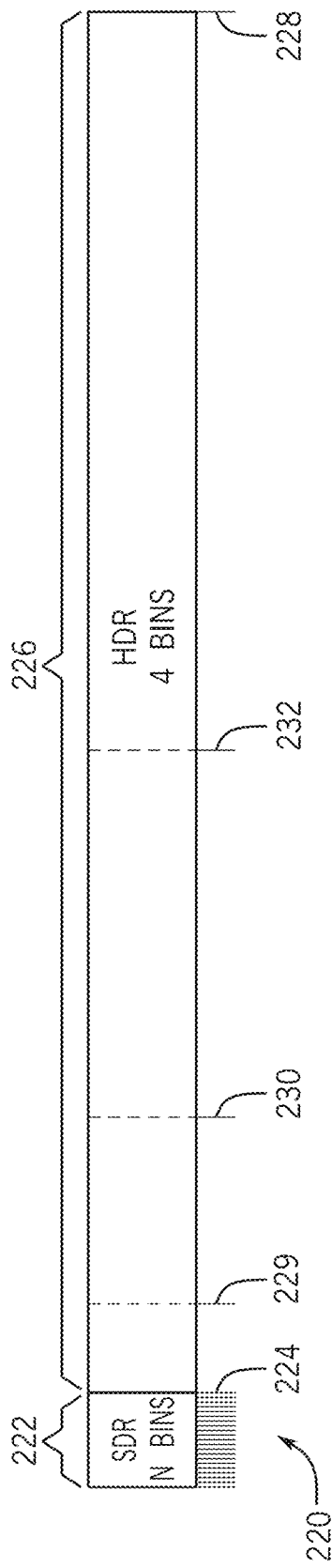
FIG. 12 is a diagram of dynamic bin allocation for a first set of image data with a first upper boundary of the first set of image data, in accordance with an embodiment of the present disclosure.

FIG. 12 illustrates a diagram 220 of an embodiment that may be used for brightness value allocations used for local tone mapping and/or other image data manipulation. As illustrated, a number (e.g., 16, 32, 64) of SDR bins may be used to bin luma values for SDR content 222 below a value that is a maximum (e.g., 1×) 224 of the SDR range. As represented herein, the dynamic assignment of HDR bins may be independent from the SDR bin assignment. Specifically, the SDR content and the bins used for SDR content may remain unchanged even when the EDR factor 136/upper boundary of the image content changes. A number (e.g., 2, 4, 8, 16, etc.) of HDR bins may also be used to bin luma values for HDR content 226 for an upper boundary 228 that is a number (e.g., 2, 4, 8, 16) of levels times the maximum 224 of the SDR range. Here, the upper boundary 228 is 16 times (16×) the maximum 224 of the SDR content 222. Based on the upper boundary 228, the PCC co-processor 104 and/or another processor sets break points 229, 230, and 232 set boundaries for each of the bins. Here, the HDR content 226 is allocated across 4 bins in a non-equidistant manner. Specifically, in the illustrated embodiment, each HDR bin after a first HDR bin is covers twice as many values as an adjacent bin to its left such that each bin may be twice the width of each previous bin. For an example, a first bin may cover a number (i) of values while a second bin covers 2i values, a third bin covers 4i values, and a fourth bin covers 8i values. If a different number of bins are used for luma values, widths of any additional bins may be calculated using as $(2^n)*(i)$, where n is the number of the HDR bin. Accordingly, when the upper boundary 228 is 16×, the break points 229, 230, and 232 are respectively set at 2×, 4×, and 8×.

Alternatively, the HDR bins may be sized in an incremental manner, where a first bin has a number (i) of values and each subsequent bin is an incremental integer times the number. For instance, a second bin may cover 2i values; a third bin may cover 3i values; and a fourth bin may cover 4i values. Additionally or alternatively, other methods of allocating the break points may be used to distribute the HDR bins. Additionally or alternatively, proportions of the allocations may change depending on a level of the upper boundary. For instance, if the upper boundary 228 of the HDR values is a first value, the width-doubling allocation may be used while incremental integers may be used when the upper boundary 228 is a second value.

Figure 13:
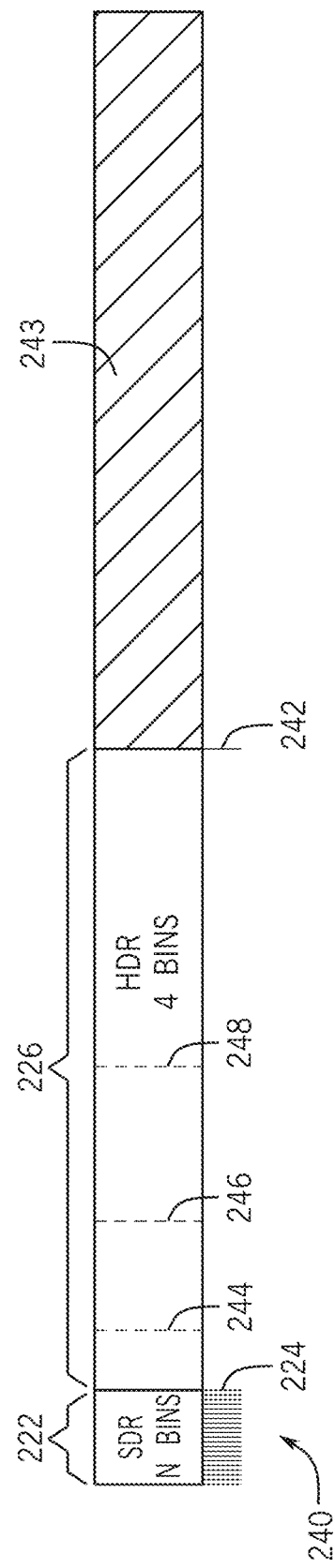
FIG. 13 is a diagram of dynamic bin allocation for a second set of image data with a second upper boundary of the second set of image data, in accordance with an embodiment of the present disclosure.

FIG. 13 illustrates a diagram 240 with an upper boundary 242 for the HDR content that is lower than the upper boundary 228 with an unused portion 243 of possible HDR values. For example, the upper boundary 242 is set at 8×. Since the width of each bin doubles with each successive bin, break points 244, 246, and 248 may be set to 1.47×, 2.4×, and 4.27×, respectively. This allocation of bins leaves unused portion 243 omitted from allocation to a bin. Additionally or alternatively, a last bin of the HDR bins may include the unused portion 243.

Figure 14:
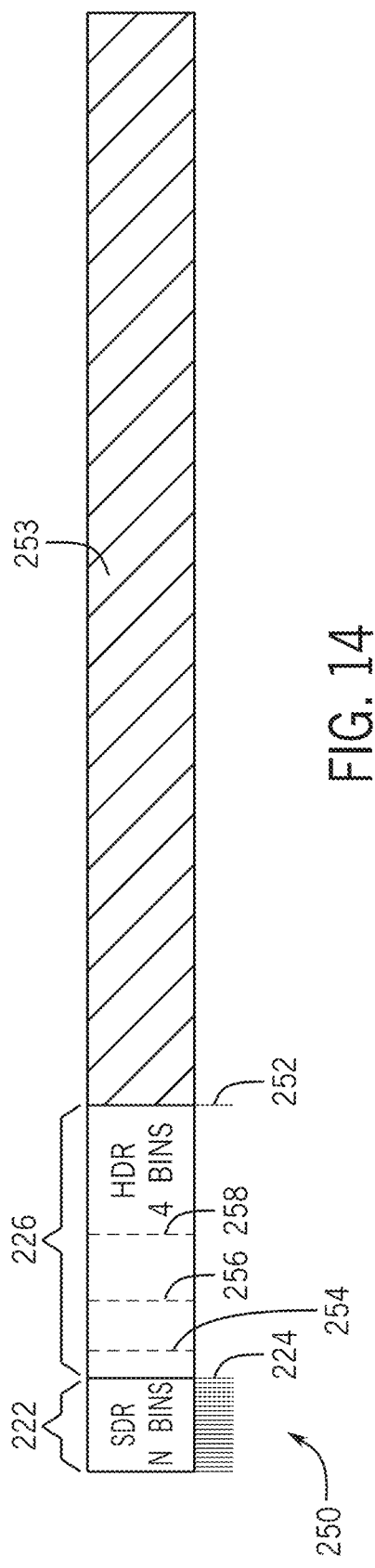
FIG. 14 is a diagram of dynamic bin allocation for a third set of image data with a third upper boundary of the third set of image data, in accordance with an embodiment of the present disclosure.

FIG. 14 illustrates a diagram 250 with an upper boundary 252 for the HDR content that is lower than the upper boundary 228 with an unused portion 253 of possible HDR values. For example, the upper boundary 252 is set at 4×. Since the width of each bin doubles with each successive bin, break points 254, 256, and 258 may be set to 1.27×, 1.8×, and 2.87×, respectively. This allocation of bins leaves the unused portion 253 omitted from allocation to a bin. Additionally or alternatively, a last bin of the HDR bins may include the unused portion 253.

Figure 15:
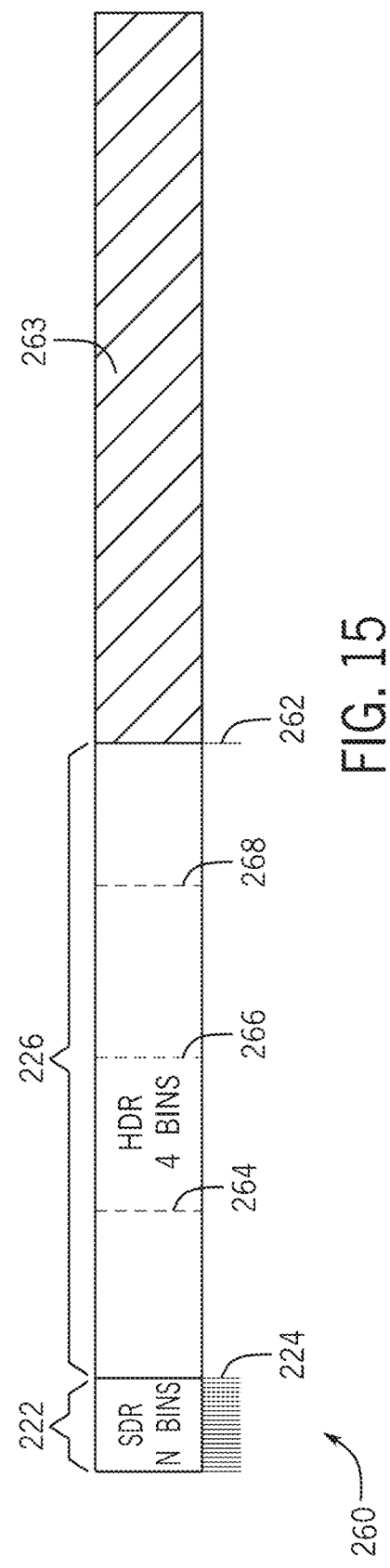
FIG. 15 is a diagram of a different dynamic bin allocation technique for the second set of image data with the second upper boundary of the second set of image data, in accordance with an embodiment of the present disclosure.

FIG. 15 illustrates a diagram 260 with an upper boundary 262 for the HDR content that is lower than the upper boundary 228 with an unused portion 263 of possible HDR values. For example, the upper boundary 262 is set at 8×. Since the width is determined using incremental integers, break points 264, 266, and 268 may be set to 1.7×, 3.1×, and 5.2×, respectively. This allocation of bins leaves the unused portion 263 omitted from allocation to a bin. Additionally or alternatively, a last bin of the HDR bins may include the unused portion 263.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A method, comprising:
   determining first break points of first bins in a histogram, wherein the first bins correspond to standard dynamic range (SDR) content in image data;
   determining a boundary of brightness content of the image data;
   determining second break points of second bins in the histogram based at least in part on the determined boundary, wherein the second bins correspond to high-dynamic range (HDR) content and the first break points are determined independently of the second break points;
   allocating luma values to the first bins and second bins based at least in part on the first and second break points; and
   displaying the image data based at least in part on the luma values allocated to the first bins and the second bins.

2. The method of claim 1, comprising processing the image data based at least in part on the allocated luma values, wherein displaying the image data comprises displaying the image data as the processed image data.

3. The method of claim 1, wherein the boundary comprises an upper boundary of the HDR content.

4. The method of claim 1, wherein there are twice as many second bins as first bins.

5. The method of claim 4, wherein a number of second bins allocated to the HDR content is statically set.

6. The method of claim 5, wherein the number comprises at least four.

7. The method of claim 4, comprising processing the image data by applying a first luma gamma curve to a first portion of the first bins and a second luma gamma curve to a second portion of the second bins.

8. The method of claim 1, wherein a number of first bins allocated to the SDR content is set using an input parameter.

9. The method of claim 1, wherein each of the second bins include incrementally more histogram values as the histogram values increase.

10. The method of claim 1, wherein the second break points are determined relative to a maximum value of the first bins.

11. The method of claim 1, wherein determining the boundary comprises determining an upper boundary of luma values of image content relative to a maximum luma value of the SDR content.

12. A system comprising:
memory storing instructions; and
processing circuitry configured to execute the instructions to cause the processing circuitry to:
receive image content;
determine first edges of first bins of first histogram values corresponding to standard dynamic range (SDR) values;
determine an upper boundary of brightness values of the image content;
determine second edges of second bins of second histogram values corresponding to high-dynamic range (HDR) values of the image content based at least in part on the upper boundary, wherein the first edges and the second edges are determined independently of each other;
allocate luma values to the first bins and the second bins based at least in part on the determined edges; and
process the image content based at least in part on the allocation of luma values to the first bins and the second bins.

13. The system of claim 12, wherein processing the image content comprises applying a first luma gamma curve to the image content corresponding to the SDR values.

14. The system of claim 13, wherein processing the image content comprises applying a second luma gamma curve to the image content corresponding to the HDR values.

15. The system of claim 12, wherein a first number of the first bins is half of a second number of the second bins.

16. The system of claim 12, wherein bins of the second bins include incrementally more histogram values than an adjacent bin of the second bins having lower histogram values.

17. The system of claim 12, comprising a processor, wherein the processing circuitry comprises a co-processor configured to assist the processor in performing pixel contrast control.

18. The system of claim 17, wherein the processor comprises a central processing unit or graphics processing unit configured to cause an electronic display to display the processed image content.

19. A tangible, non-transitory, and computer-readable medium storing instructions that, when executed by one or more processors, are configured to cause the one or more processors to:
determine first break points of first bins in a histogram, wherein the first bins correspond to standard dynamic range (SDR) content in image data;
determine a boundary of brightness content of the image data;
determine second break points of second bins in the histogram based at least in part on the determined boundary, wherein the second bins correspond to high-dynamic range (HDR) content and the first break points and the second break points are determined independently of each other;
allocate luma values to the first bins and the second bins based at least in part on the first and second break points; and
process the image data based at least in part on the luma values allocated to the first bins and the second bins.

20. The tangible, non-transitory, and computer-readable medium of claim 19, wherein processing the image data comprises:
applying a first luma gamma curve to the SDR content; and
applying a second luma gamma curve to the HDR content.

* * * * *